United States Patent
Bulan et al.

(10) Patent No.: US 8,737,747 B2
(45) Date of Patent: May 27, 2014

(54) METHOD FOR AUTOMATED TIRE DETECTION AND RECOGNITION

(75) Inventors: Orhan Bulan, Rochester, NY (US);
Robert P. Loce, Webster, NY (US);
Edgar A. Bernal, Webster, NY (US);
Wencheng Wu, Webster, NY (US);
Beilei Xu, Penfield, NY (US); Thomas F. Wade, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 394 days.

(21) Appl. No.: 13/026,367

(22) Filed: Feb. 14, 2011

(65) Prior Publication Data
US 2012/0207340 A1    Aug. 16, 2012

(51) Int. Cl.
*G06K 9/00* (2006.01)
*G06K 9/62* (2006.01)
*G06T 7/00* (2006.01)
*G01M 17/02* (2006.01)

(52) U.S. Cl.
CPC .............. *G06K 9/00* (2013.01); *G06K 9/6247* (2013.01); *G06T 7/0004* (2013.01); *G06K 2209/19* (2013.01); *G06T 2207/30236* (2013.01); *G06T 2207/20081* (2013.01); *G01M 17/027* (2013.01)
USPC .......................................... 382/224; 382/155

(58) Field of Classification Search
USPC .................. 382/155–161, 173–180, 224–228
See application file for complete search history.

(56) References Cited

U.S. PATENT DOCUMENTS

| | | | |
|---|---|---|---|
| 2003/0002707 A1* | 1/2003 | Reed et al. | 382/100 |
| 2003/0161522 A1* | 8/2003 | Campanini et al. | 382/132 |
| 2004/0022442 A1* | 2/2004 | Kim | 382/225 |
| 2005/0078869 A1* | 4/2005 | Kim | 382/190 |
| 2005/0105795 A1* | 5/2005 | Singh et al. | 382/160 |
| 2008/0025606 A1* | 1/2008 | Hanano | 382/175 |
| 2009/0244284 A1* | 10/2009 | Suita et al. | 348/148 |
| 2010/0220922 A1* | 9/2010 | Okada | 382/159 |
| 2012/0020526 A1* | 1/2012 | Teti et al. | 382/104 |

* cited by examiner

*Primary Examiner* — Alex Liew
(74) *Attorney, Agent, or Firm* — Fay Sharpe LLP

(57) ABSTRACT

Methods and systems for discriminating between tires. One or more images of an unknown tire are received. One or more tread features are extracted from the images. The class of the unknown tire is determined using a classifier that matches the tread features to known tread features.

22 Claims, 7 Drawing Sheets

METHOD FOR AUTOMATED TIRE DETECTION AND RECOGNITION

The present application relates generally to image processing. It finds particular application in conjunction with tire detection and recognition, and will be described with particular reference thereto. However, it is to be understood that it also finds application in other usage scenarios, and is not necessarily limited to the aforementioned application.

In several states and countries, the use of different types of tires is required by law. For example, some regulations mandate the use of snow tires during the winter time. As another example, local laws may require tire chains or other traction devices for specific roads or regions' roads under certain weather or seasonal conditions. As yet another example, some regulations limit the use of metal studded tires or chains to specific months or do not allow their use at any time. Fines for these types of violations typically range from $200 to $300 depending on the violation.

One challenge with maintaining such laws is enforcement. Visual inspection is a time consuming process pulling law enforcement officials away from more worthwhile endeavors. Another challenge stems from the consequences of inaccurately flagging a violation in an automatic fashion. Since traffic violations are criminal in nature, there are real consequences to inaccurately detecting a violation, whereby any automated system would have to be very accurate.

There are proposals to mark valid snow tires with a white snow flake along the side wall for easy detection of non-compliant tires. However, such a marking could easily become covered in snow and/or faked, and does not address the problem of inappropriate use of studs and chains. Beyond the snow flakes, known tire imaging techniques use specialized high speed cameras or laser scanning. However, these techniques are directed to other applications. Further, they lack the ability to integrate with existing infrastructure already laid out by law enforcement entities at toll stops, traffic lights, etc.

The present disclosure provides a new and improved and method which overcome the above-referenced problems and others.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to one aspect of the present disclosure, a method for discriminating between tire classes is provided. One or more images of an unknown tire are received. One or more tread features are extracted from the images. A class of the unknown tire is determined using a classifier that matches the tread features to known tread features.

According to another aspect of the present disclosure, a system for discriminating between tire classes is provided. The system includes a tire classification system. The tire classification system receives one or more images of an unknown tire and extracts one or more tread features from the images. A class of the unknown tire is then determined using a classifier that matches the tread features to known tread features.

According to another aspect of the present disclosure, a method for discriminating between tire classes is provided. One or more images of an unknown tire are received. The images are cropped around one or more portions thereof embodying tire tread of the unknown tire. The cropped images are enhanced using edge detection and transformed to the frequency domain. The transformed images are projected to a feature space capturing variations among different classes of tires. A class of the unknown tire is determined using a classifier that matches features of projections to known tread features.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1A:
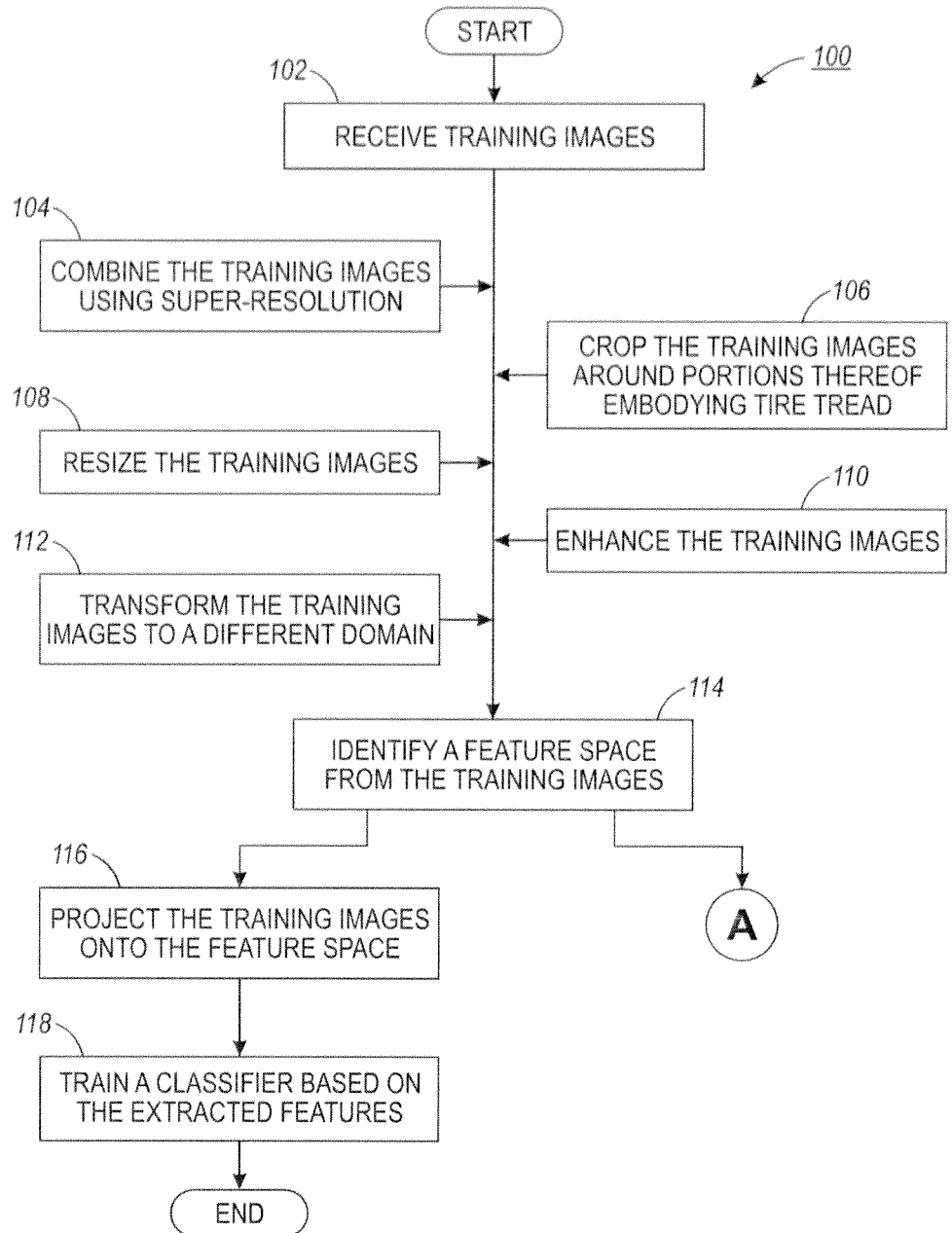
FIG. 1 is a flow chart of a method for defining a feature space for different classes of tires and training a classifier for discriminating between the different classes.

One or more embodiments or implementations are hereinafter described in conjunction with the drawings, where like reference numerals are used to refer to like elements throughout, and where the various features are not necessarily drawn to scale.

1.0 OVERVIEW

The present disclosure provides systems and methods for discriminating between different classes of tires using tire tread. It is contemplated that, in certain embodiments, tire tread includes traction aids employed to aid tires in obtaining traction, such as chains and cables. Such systems and methods are suitably employed for law enforcement purposes, but other uses are contemplated. By way of overview, one or more images of a tire are received for an unknown tire. If the images include more than tire tread of the unknown tire, the images are cropped around portions of the tire tread. The images are then employed to identify the class of the unknown tire. This includes projecting the images onto a feature space that spans variations among different classes of tires. Features are then extracted and compared with known features of the different classes of tires using a classifier. The feature space is defined and the classifier is trained during an initialization stage.

2.0 METHODS

Figure 1B:
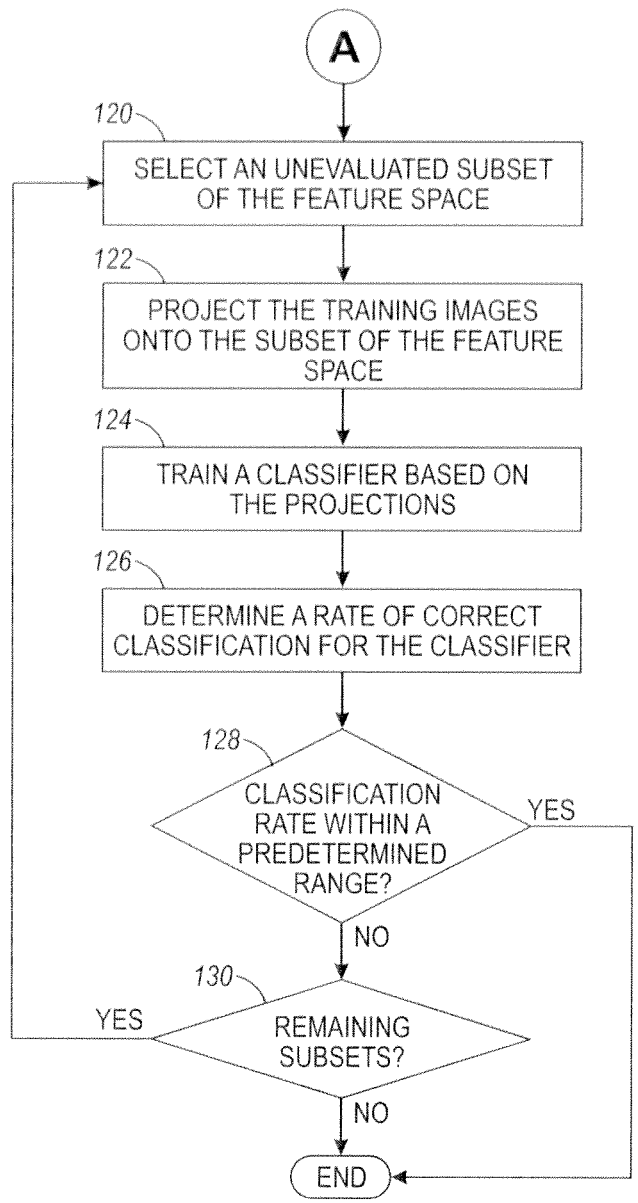

With reference to FIG. 1, a method 100 for defining a feature space for different classes of tires and training a classifier for discriminating between the different classes is provided. Classes of tires include, but are not limited to, snow tires, all-season tires, summer tires, studded tires, tires with traction aids, and the like. The actions of the method 100, hereafter described, are not necessarily dependent, whereby it is to be appreciated that some of the actions may be carried out in parallel and/or in a different sequence than shown. Further, as will be appreciated, many of the actions hereafter described can be employed before performing the method 100.

To begin, one or more training images of tires are received 102. Suitably, the training images include at least one training image for each class of tire to discriminate between. Also, insofar as the classifier is to be employed to classify a tire in motion, the training images suitably include images of tires in motion for better classification performance. It is contemplated that the training images include one or more of still images, infrared images, images drawn from a design specification, frames from videos, and the like. Further, it is contemplated that the training images are received from one or more of imaging devices, such as digital cameras, video cameras, line scan cameras, scanners, and the like; computer simulation; data files, such as image files, video files, and the like; models of tires; and the like.

If the training images include a sequence of video frames, in certain embodiments, the frames of the sequence are combined 104 using a super-resolution technique to attain a high quality image of the tire. This high quality image is then used in lieu of the sequence of video frames for the duration of the discussion of the method 100.

Further, if the training images encompass more than tire treads, in certain embodiments, the images are cropped 106 around portions of the images embodying tire tread. To locate a portion of an image embodying the tire tread, numerous approaches are contemplated. In one approach, a user manually identifies the tire tread via a graphical user interface. In another approach, a moving window moves over portions of the image. As the window moves, an evaluation function evaluates the likelihood that the portion of the image over which the window resides embodies the tire tread. In certain embodiments, the scale of the window may vary as it moves. When an evaluation score, for example, exceeds a threshold, the current portion of the image is selected.

Even more, if the training images vary in size, in certain embodiments, the images are resized 108 to the same size. In some embodiments, resizing the images to the same size is necessary to ensure features extracted from the training images align. If the features do not align from image to image, the classifier will not be able to effectively discriminate between different classes of tires. This is especially true for those classifiers and/or features spaces that are not scale-invariant.

After receiving 102 the training images and, if appropriate, performing one or more of Actions 104 through 108, the training images are optionally enhanced 110 to improve the quality of the images and/or accentuate the tire treads of the tires. Enhancements that may be employed include, but are not limited to, one or more of contrast enhancement, edge detection, Hough transformations, optical blurring compensation, motion blurring compensation, illumination non-uniformity compensation, and the like. Edge detection detects edges, such as the edges of tire tread, in an image and removes remaining information, so as to improve the visibility of the tire tread. Hough transformations identify lines and curves in images, so as to improve the visibility of tire tread.

Optical blurring compensation seeks to account for improperly or insufficiently focused images. An image is improperly focused when the focal point of the imaging device, such as a camera, used to capture the image is not focused on tire tread of a tire. Insufficient focus may occur due to, for example, the resolution of the optical system. In certain embodiments, this compensation is made using one or more of information pertaining to a focal length used to capture an image, the distance of a tire from an imaging device, the location of the imaging device relative to the tire, the optical system resolution, and the like. It is contemplated that one or more sensors, such as distance sensors, may be employed to capture at least some of this information.

Motion blurring compensation seeks to compensate for image blurring caused by motion. The motion blur vector for a point on the front surface of a tire tread can be expressed as:

$$\text{Blur} = v^* / f \tag{1}$$

where $v^*$ is the projection of the velocity vector of the point being captured onto an imaging device's image plane and f is the frame rate of the imaging device capturing the tire. Assuming the velocity and frame rate are given in meters/second and frames/second, respectively, the units of the magnitude of motion blur are meters.

The motion blur vector can be estimated given parameters that relate to motion in the image plane, such as camera specifications, estimates of vehicle speed, viewing geometry, and the like. Hereafter described is an example of how to calculate the motion blur vector for a vehicle given some sample parameters. It is assumed that the vehicle is moving at a speed of at most 5 mph and that the imaging device is located 1 m in front and 1 m to the side of the point where the target area on the tire surface is expected to be moving at its lowest speed. This speed and arrangement would be typical of a configuration at a toll stop. However, it is contemplated that one or more sensors, such as speed sensors and/or distance sensors, are employed to determine the speed of the vehicle and/or the distance of the vehicle from the camera. It is also assumed that the area of interest in the captured image or sequence of images is that which contains information about the tread characteristics of the tire.

Under these assumptions, the instantaneous velocity of the whole area of interest has vertical and horizontal components with a magnitude of 5 mph. Of those components, only the vertical is parallel to the imaging device's image plane. The projection of the horizontal velocity component onto the image plane is a vector of magnitude of 5 mph*cos(45 degrees). As a consequence, the velocity at which the area of interest in the tire is moving within the image plane has a vertical component of 5 mph and a horizontal component of 5 mpg*cos(45 degrees), which has a magnitude (speed) of 6.12 mph and an angle of 35.3 degrees for this example speed and camera configuration.

Considering an operating case in which a high-speed, low resolution digital still camera is used and another one in which a mid- to high-resolution (1 MP and up) video camera is used, the blur vector can be approximated as follows. With regard to the first operating case, a typical high-speed digital still camera has shutter speeds of $\frac{1}{1000}$s and faster. For this type of camera, the magnitude of the blur vector is equal to 2.7 mm and smaller for the above described vehicle speed and camera viewing conditions. Assuming CCD dimensions of 10.13 mm (h) by 13.57 mm (w) with a resolution of 480 (h) by 640 (w) pixels and a focal distance of 15 mm, the blur magnitude corresponds to 1.35 pixels or less. With regard to the second operating case, a typical mid- to high-resolution (1 MP and up) video camera is a traffic camera with 30 fps capability. For this type of camera, the magnitude of the blur vector is equal to 90.1 mm and smaller. Assuming the camera has a focal distance of 15 mm and COD dimensions of 10.13 mm (h) by 13.57 mm (w), the blur magnitude corresponds to 45 pixels or less. Notably, the foregoing calculations are only approximations because, among other things, the tire is moving towards the camera during the capture process and not all points in the area of interest are on the same image plane at a given time.

Illumination non-uniformity compensation seeks to account for unwanted intensity variation caused by non-uniform illumination from natural or external light sources. Unwanted intensity variation may degrade the quality of edge detection and/or feature extraction of tire tread. One approach for illumination non-uniformity compensation is to first model the illumination as a slow spatially varying intensity field and then subtract it out of the uncompensatioed image intensities.

Additionally or alternatively, the images are optionally transformed 112 to a different domain to eliminate irrelevant information, since images of tires in an uncontrolled environment typically lead to images that have irrelevant information. Irrelevant information is information irrelevant to the tire treads of the tires. Illumination variation is one example of irrelevant information. This variation can degrade recognition performance significantly if features are extracted without accounting for it. As is to be appreciated, the images are generally in the spatial domain. Hence, different domains to which the images may be transformed to include, but are not limited to, the wavelet domain and/or the frequency domain, on the phase and/or magnitude spectrum. A domain transformation may be employed in conjunction with one or more image enhancements. For example, it is contemplated a wavelet transformation or Fourier transformation is performed on the images as enhanced by edge detection.

The training images (as enhanced and/or transformed, if applicable) are next employed to identify 114 a feature space that spans variations among different classes of tires. Suitably, this is performed automatically, but it is contemplated that an expert defines the feature space. To automatically determine the feature space, the training images can be first converted into one- or higher-dimensional representations, which form a vector space with dimension equal to the number of elements of each vector. When the images are sized equally, the vector representations will be equal in size. However, it is to be appreciated that, in certain embodiments, the vector representations do not need to be equally in size. For example, neural network and tree-based classifiers are not limited to equal dimensionality and vector lengths.

Vector representations of tire images are clustered and located in a small subspace of this vector space. This subspace is denoted as a feature space for the tire images and in it images can be defined in terms of a set of basis vectors. Without loss of generality, assuming the dimensionality of the feature space is a scalar n, then the feature space contains all the vectors of the form $v = a_1 u_1 + a_2 u_2 + \ldots + a_n u_n$, where $a_i$'s are arbitrary scalars and $(u_1, u_2, \ldots, u_n)$ forms the set of basis vectors. Tire images located in this feature space can be defined as a linear combination of the basis vectors. Hence, after converting the training images to vector representations, basis vectors are determined.

Basis vectors may be identified using a dimensionality reduction technique, such as Principal Component Analysis (PCA), Linear Discriminant Analysis (LDA), Independent Component Analysis (ICA), and the like. PCA defines the orthogonal basis vectors along the directions of the largest variance of the training images without requiring the training images to be labeled. LDA, on the other hand, requires the training images to be labeled according to their respective tire class to define the basis vectors. The basis vectors (not restricted to be orthogonal) defined by LDA lie along the direction of maximum separation between different types of tires.

Once the feature space is identified 114, the method 100 may proceed to train the classifier. As will be seen below, one approach to training the classifier works on the assumption that it may be unnecessary to employ the entire feature space for accurately discriminating between different classes of tires. Hence, in a sense, it is an optimization of another approach described hereafter.

According to one approach to training the classifier, the training images are projected 116 onto the feature space by calculating coefficients $a_i$ for the vector representation v of each of the training images. When the basis vectors are orthogonal (e.g., when PCA is employed), the coefficients $a_i$ may be determined by calculating the dot product between v and each of the basis vectors in the basis set $(u_1, u_2, \ldots, u_n)$, as follows:

$$a_i = v u_i, \forall i=1, 2, \ldots, n \qquad (2)$$

By projecting a vector representation v of a training image onto the feature space, an n dimensional feature vector $(a_1, a_2, \ldots, a_n)$ in the feature space is obtained for the training image.

The projections and corresponding class labels are next employed to train 118 a classifier, such as linear Support Vector Machine (SVM), k-means Clustering or Expectation Maximization (EM) Algorithms, and the like. Suitably, for each of the classes of tires to discriminate between, the training 118 seeks to determine a set of feature ranges that uniquely identify the class.

According to another approach to training the classifier, an unevaluated subset of the feature space is selected 120. A subset of the feature space is comprised of a subset $(u_1^T, u_2^T, \ldots, u_m^T)$ of the basis vectors of the feature space, where m is the dimension of the subset. Further, a subset is unevaluated in the sense that it has not been evaluated to determine its ability to correctly discriminate between different classes of tires. No particular selection scheme is required, however, it is contemplated the first k+1 basis vectors of the feature space are selected, where k is the number of basis vectors previously selected. During the first selection, k will be taken as zero.

After selecting 120 the subset, the training images are projected 122 onto the subset by calculating coefficients $a_i$ for the vector representation v of each of the training images. When the basis vectors are orthogonal (e.g., when PCA is employed), the coefficients $a_i$ may be determined by calculating the dot product between v and each of the basis vectors in the basis set $(u_1^T, u_2^T, \ldots, u_m^T)$, as follows:

$$a_i = v u_i^T, \forall i=1, 2, \ldots, m \qquad (3)$$

As above, by projecting a vector representation v of a training image onto the subset, an in dimensional feature vector $(a_1, a_2, \ldots, a_m)$ is obtained for the training image.

Similar to above, the projections and corresponding class labels are next employed to train 124 a classifier, such as linear Support Vector Machine (SVM), k-means Clustering or Expectation Maximization (EM) Algorithms, and the like. Suitably, for each of the classes of tires to discriminate between, the training seeks to determine a set of feature ranges that uniquely identify the class.

After training 124 the classifier, a correct classification rate is determined 126 for the classifier using the training images. To do so, the classifier is employed to classify each of the training images, and the classifications are compared against the known classifications. Based upon the classification rate, a determination 128 is made as to whether the classification is within a predetermined range. The range suitably corresponds to a range of acceptable classifications rates. For example, this range may be a classification rate greater than 95%. If the classification rate is acceptable, the subset of the feature space is selected for subsequent use in classifying unknown tires. However, if the classification rate is unacceptable, a determination 130 is made as to whether there are remaining subsets of the feature space. If there are remaining subsets, Actions 120 through 130 repeat. Otherwise, the feature space is selected for subsequent use in classifying unknown tires.

Figure 2:
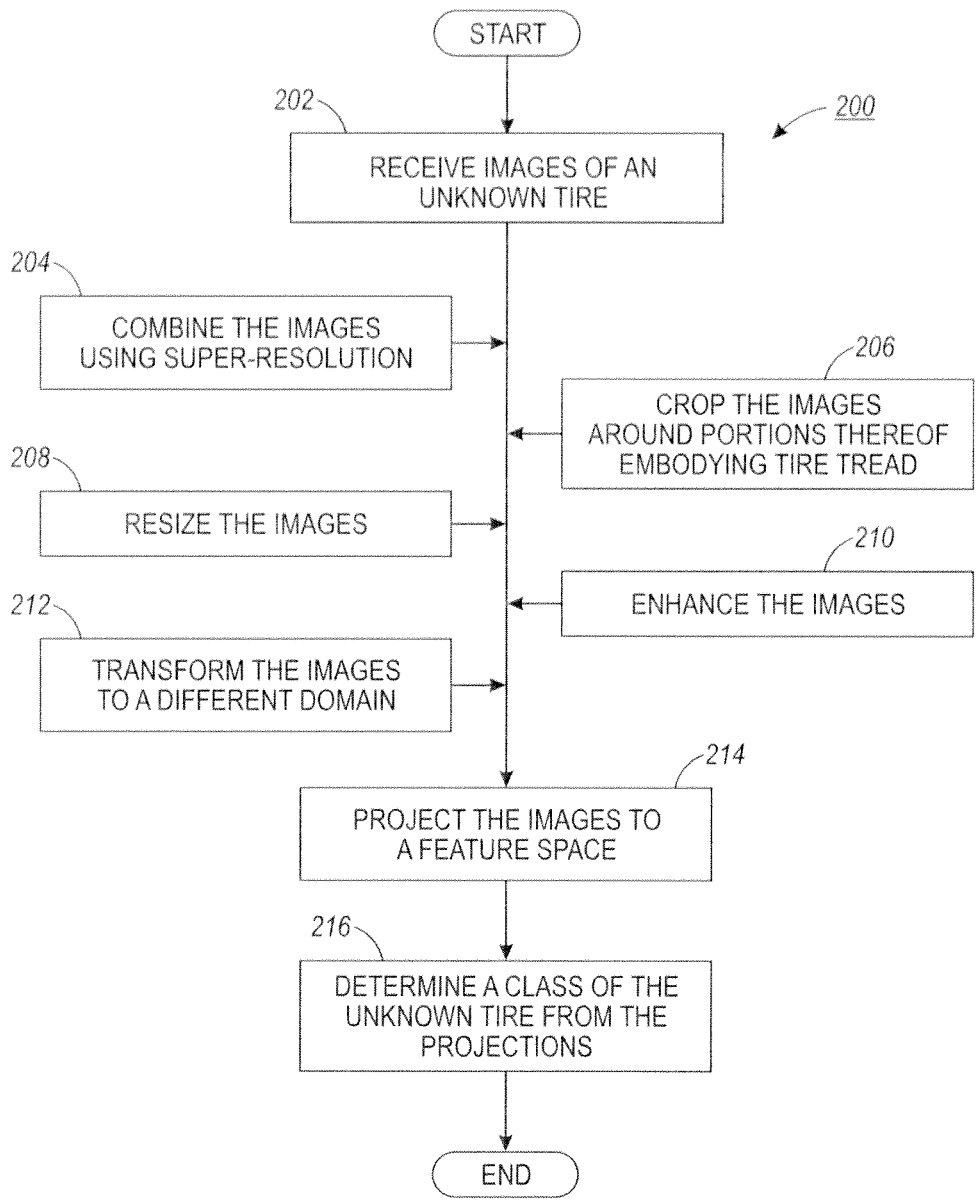
FIG. 2 is a flow chart of a method for classifying an unknown tire.

With reference to FIG. 2, a method 200 for classifying an unknown tire is provided. Classes of tires include, but are not limited to, snow tires, all-season tires, summer tires, studded tires, tires using traction aids, and the like. The method presupposes a feature space and a trained classifier, which can be obtained through application of the method 100 of FIG. 1. The actions of the method 200, hereafter described, are not necessarily dependent, whereby it is to be appreciated that some of the actions may be carried out in parallel and/or in a different sequence than shown.

To begin, one or more images of an unknown tire are received 202. An unknown tire is a tire for which no classification is known. It is contemplated that the images include one or more of still images, infrared images, frames from videos, and the like. Further, it is contemplated that the images are received from one or more of imaging devices, such as digital cameras, video cameras, line scan cameras, scanners, and the like; computer simulation; data files, such as image files, video files, and the like; models of tires; and the like.

If the images include a sequence of video frames, in certain embodiments, the frames of the sequence can be combined 204 using a super-resolution technique to attain a high quality image of the tire. This high quality image is then used in lieu of the sequence of video frames for the duration of the discussion of the method 200.

Further, if the images encompass more than tire treads, in certain embodiments, the images are cropped 206 around portions of the images embodying the tire treads. To locate a portion of an image embodying tire tread, the method 300 of FIG. 3, described hereafter, is suitably employed. However, other approaches are contemplated. For example, it is contemplated that a user manually identifies the tire tread via a graphical user interface. As another example, a moving window moves over portions of the image. As the window moves, an evaluation function evaluates the likelihood that the portion of the image over which the window resides embodies the tire tread. In certain embodiments, the scale of the window may vary as it moves. When an evaluation score, for example, exceeds a threshold, the current portion of the image is selected.

Even more, if the images vary in size from the image size employed for feature extraction during training, in certain embodiments, the images are resized 208 to the size used during training. In some embodiments, resizing the images to the size used during training is necessary to ensure features extracted from the training images align with features extracted from the images of the unknown tire. If the features do not align, the classifier will not be able to effectively classify the unknown tire. This is especially true for those classifiers and/or features spaces that are not scale-invariant.

After receiving 202 the images and, if appropriate, performing one or more of Actions 204 through 208, the images are optionally enhanced 210 to improve the quality of the images and/or accentuate the tire tread of the unknown tire. Enhancements include, but are not limited to, one or more of contrast enhancement, edge detection, Hough transformations, optical blurring compensation, motion blurring compensation, illumination non-uniformity compensation, and the like. These enhancements are as described in connection with Action 110 of FIG. 1. The enhancements employed should parallel those employed during training. For example, if edge detection was applied to the training images, edge detection should similarly be applied to the images of the unknown tire.

Additionally or alternatively, the images are optionally transformed 212 to a different domain to eliminate irrelevant information, since images of tires captured in an uncontrolled environment typically lead to images that have irrelevant information. Irrelevant information is information irrelevant to the tire tread of the tire, such as illumination. Different domains include, but are not limited to, the wavelet domain and/or the frequency domain, on the phase and/or magnitude spectrum. These domains are as described in connection with Action 112 of FIG. 1. If a transformation is employed, the transformation should parallel the transformation employed during training. For example, if the training images were transformed to the frequency domain, the images should similarly be transformed to the frequency domain.

The images are next projected 214 on to the feature space defined during a training stage. The feature space is suitably tailored to tire tread. To project 214 the images to the feature space, the images are first converted into one- or higher-dimensional vector representations, which form a vector space with dimension equal to the number of elements of each vector. Coefficients $a_i$ are then calculated for the vector representation v of each of the images. When the basis vectors are orthogonal (e.g., when PCA is employed), the coefficients $a_i$ may be determined by calculating the dot product between v and each of the basis vectors in the basis set $(u_1, u_2, \ldots, u_n)$, as follows:

$$a_i = v u_i, \forall i=1, 2, \ldots, n \quad (4)$$

By projecting a vector representation v of an image onto the feature space, an n dimensional feature vector $(a_1, a_2, \ldots, a_n)$ in the feature space is obtained for the image.

A determination 216 as to the class of the unknown tire is then made using the classifier. This includes comparing the features extracted from the images against known features extracted from the training images and/or models of tires using the classifier. In certain embodiments, where the images include a plurality of images, polling may be employed. That is to say, a classification may be determined for each of the images and the most prevalent classification among the images is taken as the classification of the unknown tire. Additionally, in certain embodiments, to expand the collection of training images used for defining the feature space, the unknown image and its determined classification are presented to a user via a graphical user so the user may confirm the classification. Insofar as the classification is determined to be correct, the unknown image may be added to the training set.

Figure 3:
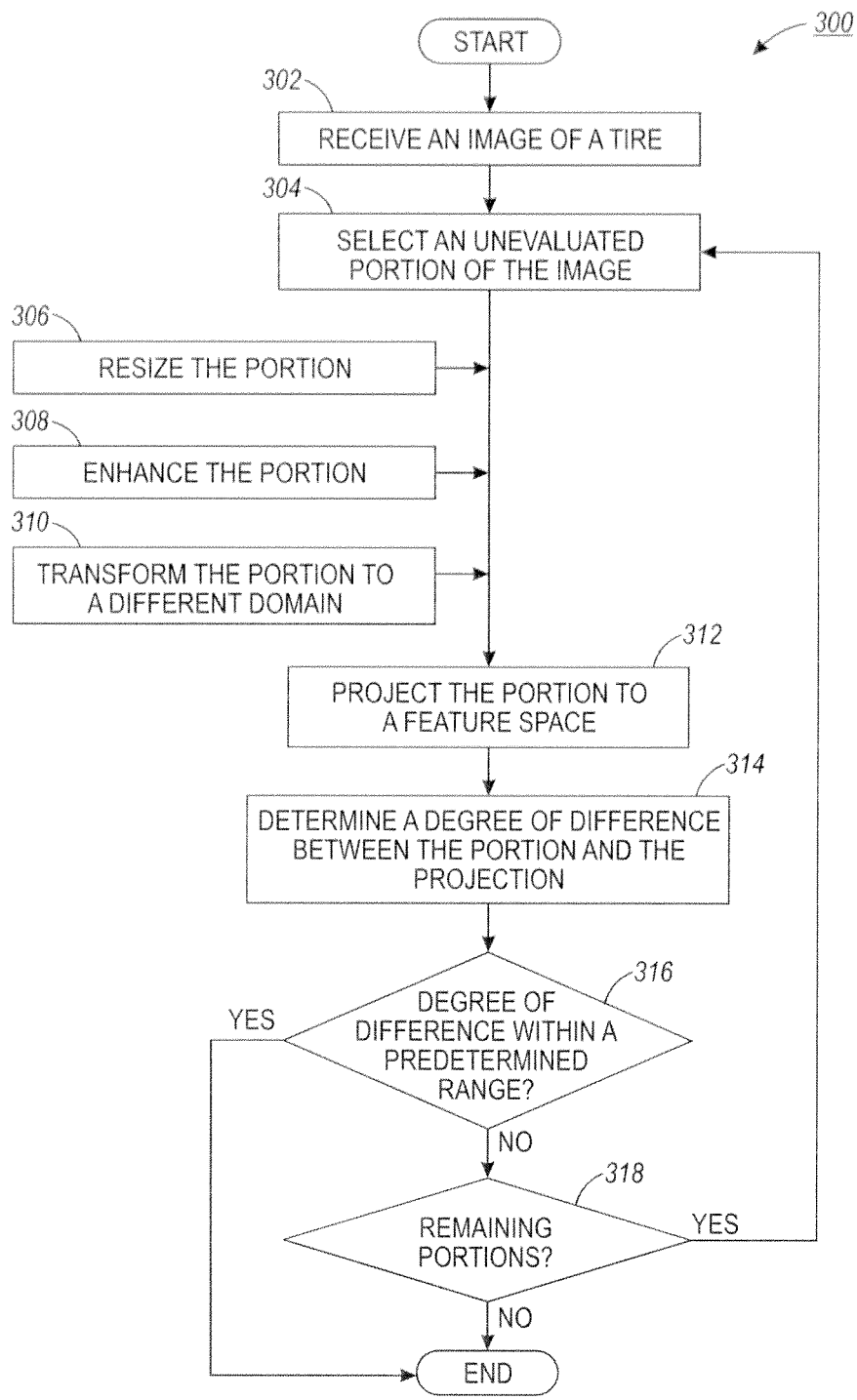
FIG. 3 is a flow chart of a method for locating tire tread within an image.

With reference to FIG. 3, a method 300 for locating tire tread within an image is provided. To begin, an image is received 302. It is contemplated that the image is one or more of a still image, an infrared image, a frame from a video, and the like. Further, it is contemplated that the image is received from one or more of imaging devices, such as digital cameras, video cameras, line scan cameras, scanners, and the like; computer simulation; data files, such as image files, video files, and the like; models of tires; and the like.

Thereafter, an unevaluated portion of the image is selected 304. A portion is unevaluated in the sense that it has not been evaluated to determine its similarity with its projection. Although, no particular selection scheme is required, portions are suitably selected in an overlapping-windowing manner for computational efficiency and according to one or more pre-specified scales. In certain embodiments, selection may be dependent upon previously iterations. For example, if the degree of similarity of a portion was high as compared to other portions selected thus far, portions may be selected in proximity to this portion.

If the selected portion varies in size from the image size employed for feature extraction during training, in certain embodiments, the portion is resized 306 to the size used during training. In some embodiments, resizing the portion to the size used during training is necessary to ensure feature extracted from the training images align with features extracted from the portion. This is especially true for feature spaces that are not scale invariant.

After selecting 304 the portion and, if appropriate, resizing 306 the portion, the portion is optionally enhanced 308 to improve the quality of the portion and/or accentuate tire tread that may be in the portion. Enhancements include, but are not limited to, one or more of contrast enhancement, edge detection, Hough transformations, optical blurring compensation, motion blurring compensation, illumination non-uniformity compensation, and the like. These enhancements are as described in connection with Action 110 of FIG. 1. The enhancements employed should parallel those employed during training. For example, if edge detection was applied to the training images, edge detection should similarly be applied to the image.

Additionally or alternatively, the portion is optionally transformed 310 to a different domain to eliminate irrelevant information, since images of tires captured in an uncontrolled environment typically lead to images that have irrelevant information. Irrelevant information is information irrelevant to the tire tread of the tire, such as illumination. Different domains include, but are not limited to, the wavelet domain and/or the frequency domain, on the phase and/or magnitude spectrum. These domains are as described in connection with Action 112 of FIG. 1. A transformation should be employed if the transformation was employed during training. For example, if the training images were transformed to the frequency domain, the portion should similarly be transformed to the frequency domain.

The portion is next projected 312 on to a feature space defined during training. To project 312 the portion to the feature spaces, the portion is first converted into one-dimensional vector representations. Coefficients $a_i$ are then calculated for the vector representation v of the portion. When the basis vectors are orthogonal (e.g., when PCA was employed to define the feature space), the coefficients $a_i$ may be determined by calculating the dot product between v and each of the basis vectors in the basis set $(u_1, u_2, \ldots, u_n)$, as follows:

$$a_i = vu_i, \forall i=1, 2, \ldots, n \qquad (5)$$

By projecting the vector representation v of the portion onto the feature space, an n dimensional feature vector $(a_1, a_2, \ldots, a_n)$ in the feature space is obtained for the portion.

The portion and the projection are then compared to determine a degree of difference therebetween. One approach to determining the degree of difference between the portion and the projection is to compare the vector representations using, for example, the Euclidean distance d therebetween. The projection of the portion can be formatted as a vector v' as follows:

$$v' = a_1 u_1 + a_2 u_2 + \ldots + a_n u_n \qquad (6)$$

where $u_i$ are the basis vectors of the feature space.

Based upon the comparison, a determination 316 as whether the degree of difference is within a predetermined range. The range suitably corresponds to a degree of similarity sufficient to provide a user of the method 300 with confidence that the portion corresponds to tire tread. For example, this range may require the degree of difference to be less than a predetermined threshold. If the degree of difference is acceptable, the portion is selected as being of tire tread. However, if the degree of similarity is unacceptable, a determination 318 is made as to whether there are remaining portions of the image. If there are remaining portions, Actions 304 through 318 repeat. Otherwise, the best portion of the image is selected as being of tire tread.

3.0 SYSTEMS

Figure 4:
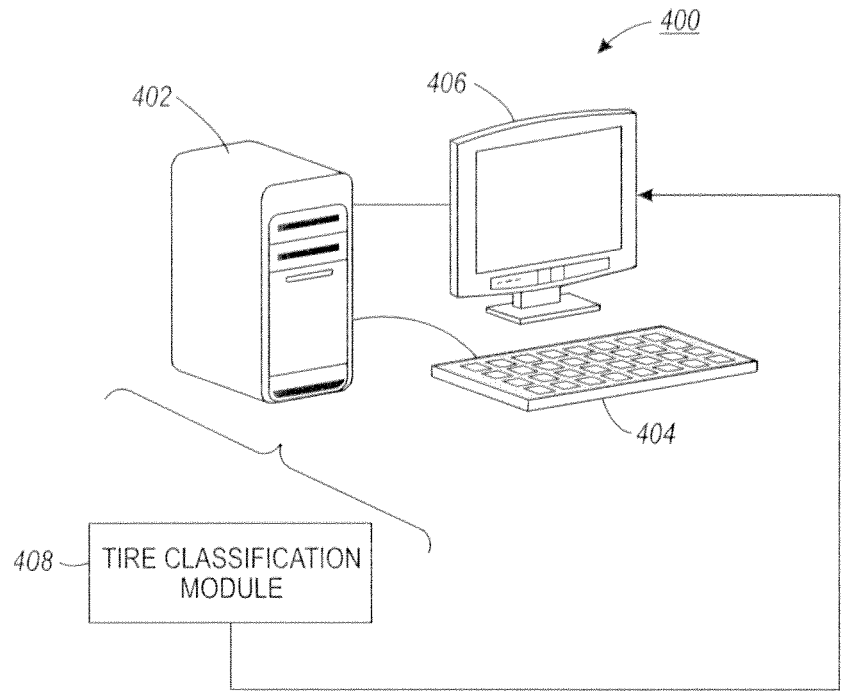
FIG. 4 is a tire classification system for discriminating between the different classes.

With reference to FIG. 4, a tire classification system 400 is provided. It is contemplated that the tire classification system 400 is employed to enforce laws pertaining to tires. Further, it is contemplated that the tire classification system 400 is employed at a checkpoint and/or toll stops, in a mobile unit, such as mobile speed device, and the like. One or more computers or other digital/electronic processing devices 402, each including storage and a digital/electronic processor, such as a microprocessor, microcontroller, graphic processing unit (GPU), etc., suitably embody the system 400. However, the system 400 may alternatively be embodied by one or more servers, each including a digital processor and each including or having access to digital data storage, such servers being suitably accessed via the Internet or a local area network, or by a personal data assistant (PDA) or smart phone including a digital processor and digital data storage, or so forth.

The computers or other digital/electronic processing devices 402 suitably include or are operatively connected with one or more user input devices 404, such as a keyboard, mouse, touch screen, etc., for receiving user input to control the system 400. Further, the computers or other digital/electronic processing devices 402 suitably include or are operatively connected with one or more display devices 406, such as an LCD, a plasma display, a projector, etc., for displaying output generated by the system 400. In other embodiments, the input for controlling the system 400 is received from programs running on the computers or other digital/electronic processing devices 402, or from a network connection, or so forth. Similarly, in other embodiments the output may serve as input to a program running on the computers or other digital/electronic processing devices 402, or may be transmitted via a network connection, or so forth.

The system 400 includes a tire classification module 408 that implements one or more aspects of the methods disclosed herein, such as the method 200 of FIG. 2. Suitably, the module 408 receives one or more training images and/or one or more images of an unknown tire. It is contemplated that these training images and/or images of the unknown tire are local to the system 400 and/or received from a device and/or program external to the system 400. For example, the images of the unknown tire may be received from an imaging device, such as a camera. Further, the module 408 suitably outputs a classification for the unknown tire based on the training images and/or the images of the unknown tire. In some embodiments, the tire classification module 408 is embodied by a storage medium storing instructions executable by the computers or other digital/electronic processing devices 402. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Figure 5:
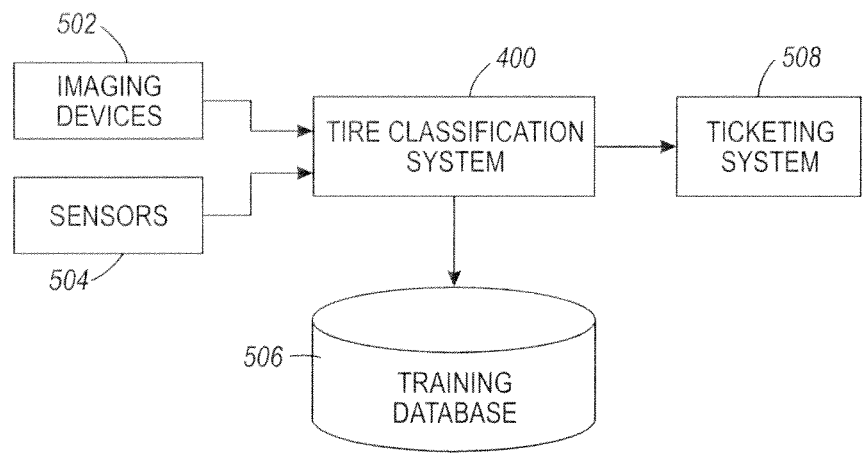
FIG. 5 is a block diagram of a law enforcement system employing a tire classification system.

With reference to FIG. 5, a block diagram of a law enforcement system 500 employing the tire classification system 400 is provided. The illustrated embodiment is not to be construed as limiting the structural arrangement of components and/or the interconnections between components. It is contemplated that the law enforcement system 500 is suitably employed at a checkpoint and/or toll stop, in a mobile unit, such as mobile speed device, and the like.

The tire classification system 400 receives one or more images of tires from one or more imaging devices 502. It is contemplated that these images include one or more of still images, video frames, infrared images, images drawn from a design specification, and the like. Further, it is contemplated that the imaging devices 502 include one or more of video cameras, COD cameras, high-speed cameras, infrared cameras, line scan cameras, traffic surveillance cameras, and the like. In certain embodiments, the imaging devices 502 include a plurality of imaging devices positioned at varying angles to capture different angles of tires. Additionally or alternatively, in certain embodiments, the imaging devices 502 are arranged at specialized angles to optimize shadows on tire tread. Additionally or alternatively, in certain embodiments, the imaging devices 502 include light sources illuminating the target for image captures. It is contemplated that these light sources include one or more of infrared lights, visible lights, and so on.

The tire classification system 400 optionally receives further input from one or more sensors 504. In certain embodiments, the sensors 504 include motion sensors so the tire classification system 400 can detect the presence of a vehicle. In such embodiments, it is contemplated that the tire classification system 400 may capture images from the imaging devices 502 upon detection of a vehicle. Additionally or alternatively, in certain embodiments, the sensors 504 include sensors to measure the distance of a detected vehicle from the imaging devices 502 and/or the speed of the vehicle for, among other things, compensating for motion blur.

Upon receiving images from the imaging devices 502, the tire classification system 400 identifies the class of tire in the images according to the methods disclosed herein, such as the method 200 of FIG. 2. To facilitate the classification of tires, the tire classification system 400 is suitably trained on one or more training images of the different classes of tires to discriminate between. It is contemplated that these training images are local to the tire classifications system 400 and/or external in a training database 506.

After identifying the class of a tire in received images, the classification system 400 generates an audio and/or visual indication of the classification. Additionally or alternatively, the classification system 400 provides the determined classification to a ticketing system 508. The ticketing system 508 suitably compares the classification against local rules and/or regulations to determine whether the tire was compliant with the rules and/or regulations. It is contemplate that a rules engine, for example, is employed for this purpose. If a tire is found to be non-compliant, the ticketing system 508 may then take the appropriate action to identify the owner of the vehicle to which the tire belongs and/or issue a ticket.

Figure 6:
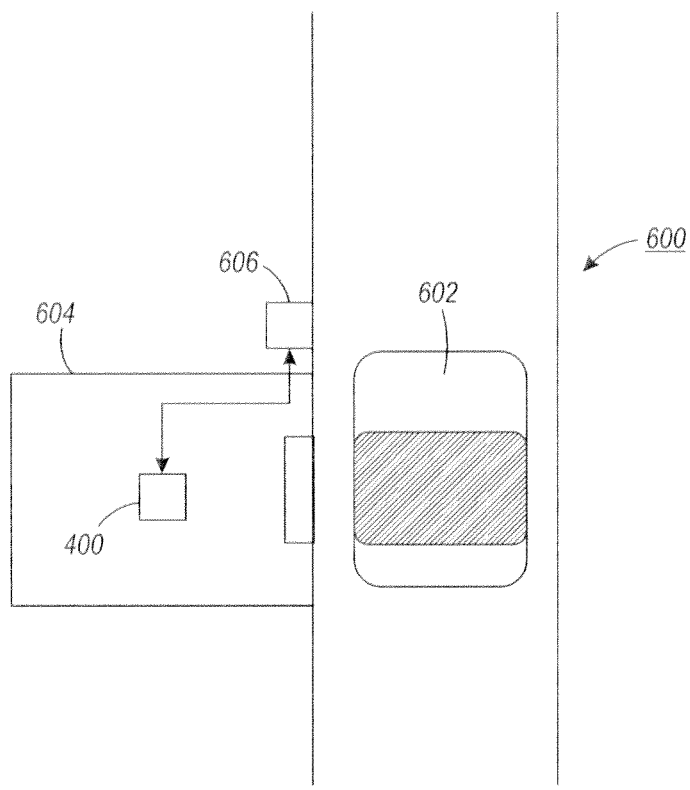
FIG. 6 is a top plan view of a toll stop employing a tire classification system; and, FIG. 7 is a graph illustrating the relationship between classification rate and motion blur.

With reference to FIG. 6, a top plan view of a toll stop 600 employing the tire classification system 400 of FIG. 4 is provided. As illustrated, a vehicle 602 approaches a tollbooth 604 to pay a toll and/or receive a toll ticket from an attendant, automated or otherwise, in the tollbooth 604. Suitably to pay the toll and/or receive the toll ticket, the vehicle slows to 5 mph or less. As the vehicle 602 is paying the toll and/or receiving the toll ticket, one or more sensors and/or imaging devices 606 capture one or more images of the front, driver-side tire of the vehicle 602. Upon capturing the images, the tire classification system 400 analyzes the images to determine the classification of the tire using the methods disclosed herein, such as the method 200 of FIG. 2. Upon determining the classification of the tire of the vehicle 602, the attendant (assuming a human attendant) is suitably notified of the class of tires employed by the vehicle 602. Additionally or alternatively, the determination is passed to a ticketing system, such as the ticketing system 508 of FIG. 5.

4.0 RESULTS

The methods of the present disclosure were tested on a database generated from tire images downloaded from www.tirerack.com. The tire images include tires images of snow tires, all-season tires, and summer tires. Tire tread images were obtained by cropping a small portion (approximately 75×75 pixels) of the downloaded tire images. The cropped images were then bicubically interpolated to 250× 250 pixels, so that all the images in the training set had the same size and scale. The database contained images of all three types of tires captured from two different angles, with significant illumination variation across the images. The generated database was then used to test the methods disclosed herein.

Training as used hereafter was performed using the method 100 of FIG. 1. The images were enhanced via edge detection and transformed to the frequency domain. Next, PCA was employed to identify the feature space.

The first recognition task performed was the discrimination between snow tires from all-season and summer tires. For this purpose, a subset of the images in the database was selected. This subset contained 140 snow tire, 70 all-season tires, and 70 summer tires. Training and test images were then randomly selected from this subset of images. Training was performed using the training images and then the test images were classified using the method 200 of FIG. 2. After applying the methods disclosed herein 10 times, the average recognition rate was 97.86%.

The ability of the methods disclosed herein to recognize all-season and summer tires were also tested following a similar procedure as above. The correct classification rates in these scenarios were 84.79% and 93.36%, respectively.

Figure 7:
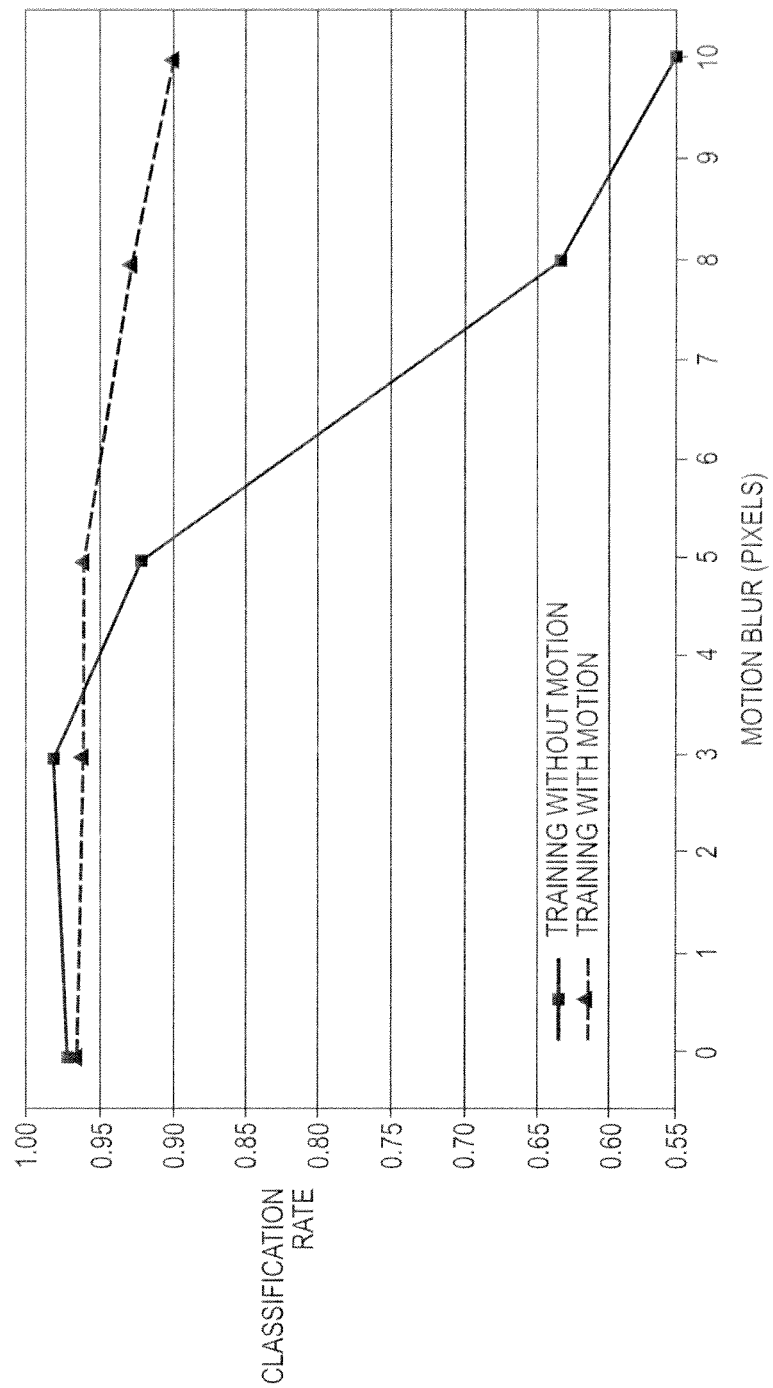

The impact of motion blur on the performance of the methods disclosed herein was also tested. To this end, two experiments were performed. In the first experiment, the motion blur was simulated on test images only and in the second test it was applied to both the test and training images. In both cases, no motion blur, 3 pixel motion blur, 5 pixel motion blur, 8 pixel motion blur and 10 pixel motion blur were tested. The classification rate in each case is shown in FIG. 7. When motion blur is only applied to test images, the classification rate decreases quickly with increasing blur. However, using images with motion blur in the training set decreases the effect of the blur on the recognition rate. Other ways of compensating for the effect of motion blur include deblurring the images when the motion vector can be accurately estimated and using multiple video frames to obtain a high resolution image (i.e., super-resolution).

Lastly, the methods disclosed herein were tested on a different set of 167 test images with practical degradations to discriminate snow tires from all-season and summer tires.

The images in the test set were captured from different angles, with different rotations, with dust, mud and snow on them to represent the worst case scenario. In an actual application, however, tire images will all be captured from the same view and have the same rotation. The database generated from the images downloaded from www.tiretrack.com was used for the training set. The methods disclosed herein described herein recognized 87.43% of the tire images correctly under these conditions.

5.0 CONCLUSION

Systems and methods for discriminating between different classes of tires are provided herein. Such systems and methods are suitably employed for law enforcement purposes using existing infrastructure. Further, while certain camera based law enforcement functions have been very controversial, such as ticketing a vehicle owner rather than the driver for an infraction, the present disclosure does not suffer from that controversy. Any identified infractions are the responsibility of the vehicle owner, not the driver.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for discriminating between tires, said method comprising:
   receiving vector representations of training images of tire treads, the vector representations describing the corresponding training images using a vector space, wherein the vector representations are clustered in a subspace of the vector space;
   analyzing the received vector representations to identify the subspace of the vector space using a dimensionality reduction technique, the subspace of the vector space being a feature space;
   projecting the received vector representations to the feature space to generate feature vectors;
   training a classifier to classify tires using tread features of the generated feature vectors;
   receiving one or more images of an unknown tire;
   extracting the tread features from the received images of the unknown tire; and,
   determining a class of the unknown tire using the classifier, the classifier matching the extracted tread features to the tread features extracted from the training images.

2. The method according to claim 1, further including:
   transforming the images to a domain that eliminates irrelevant information, where the extraction is performed on the transformed images.

3. The method according to claim 1, further including:
   cropping the images around one or more portions thereof embodying tire tread of the unknown tire, where the extraction is performed on the cropped images.

4. The method according to claim 3, wherein the cropping of the images includes:
   for each of the images:
     selecting a portion of the image;
     projecting the portion to the feature space;
     determining a degree of difference between the portion and the projected portion;
     cropping the image around the portion if the degree of difference is within a predetermine range; and,
     repeating for a different portion of the image otherwise.

5. The method according to claim 1, further including:
   combining the images using super-resolution into one or more combined images, wherein the extraction is performed on the combined images.

6. The method according to claim 1, wherein the extraction includes extracting one or more tread features from each of the images, and wherein the determination includes:
   for each of the images, determining a class of the unknown tire by matching the tread features of the image to the known tread features; and,
   polling the determined classes of the images to determine the class of the unknown tire.

7. The method according to claim 1, wherein the extraction includes:
   projecting the images to the feature space, the feature space capturing variations among different classes of training images.

8. The method according to claim 1, wherein the extracted features are determined by modeling different classes of tires.

9. The method according to claim 1, wherein classes of tires include one or more of snow tires, all-season tires, summer tires, studded tires, and tires with traction aids.

10. The method according to claim 1, further including:
    projecting the received vector representations to a subset of the feature space to generate the feature vector;
    determining a rate of correct classification of the trained classifier; and
    in response to the rate falling outside a predetermined range, re-training the classifier using a different subset of the feature space.

11. The method according to claim 1, wherein the dimensionality reduction technique is one of principal component analysis (PCA), linear discriminant analysis (LDA), and independent component analysis (ICA).

12. A system for discriminating between tires, said system comprising:
    a tire classification system that:
      receives one or more images of an unknown tire;
      projects the received images to a feature space to generate feature vectors, the feature space corresponding to a subspace of a vector space within which vector representations of training images cluster, wherein the subspace is determined using a dimensionality reduction technique;
      determines a class of the unknown tire using a classifier that matches tread features of the generated feature vectors to tread features extracted from the training images, wherein the classifier is trained using the training images;
      projects the training images to a subset of the feature space to generate feature vectors;
      trains the classifier to classify tires using tread features of the generated feature vectors;
      determines a rate of correct classification of the trained classifier; and
      in response to the rate falling outside a predetermined range, re-trains the classifier using a different subset of the feature space.

13. A system for discriminating between tires, said system comprising:
    a tire classification system that:
      receives one or more images of an unknown tire;
      projects the received images to a feature space to generate feature vectors, the feature space corresponding to a subspace of a vector space within which vector representations of training images cluster, wherein the subspace is determined using a dimensionality reduction technique;

determines a class of the unknown tire using a classifier that matches tread features of the generated feature vectors to tread features extracted from the training images, wherein the classifier is trained using the training images;

receives vector representations of the training images, the vector representations describing the corresponding training images using the vector space, and the vector representations being clustered in the subspace;

analyzes the received vector representations to identify the subspace using a dimensionality reduction technique;

projects the received vector representations to the feature space to generate training feature vectors; and trains the classifier to classify tires using tread features of the generated training feature vectors.

14. The system according to claim 13, further comprising:
one or more imaging devices, wherein the tire classification system receives the images from the imaging devices.

15. The system according to claim 14, wherein the imaging devices include one or more light sources illuminating targets for image capture.

16. The system according to claim 14, further comprising:
one or more sensors for measuring the distance of the imaging devices from the unknown tire and/or the speed of the tire.

17. The system according to claim 13, wherein the tire classification system is further operative to transform the images to a domain that eliminates irrelevant information, where the projection is performed on the transformed images.

18. The system according to claim 13, wherein the feature space captures variations among different classes of training images.

19. The system according to claim 13, wherein the tire classification system is further operative to train the classifier using the training images.

20. The system according to claim 19, wherein the training includes:
identifying the feature space from the training images, the feature space capturing variations among different classes of training images;

projecting the training images to the feature space, wherein the tread features are extracted from the feature space; and, training the classifier using the tread features extracted from the training images.

21. The system according to claim 13, further comprising:
a ticketing system determining whether the known tire is compliant with one or more rules, wherein the determination is based upon the class determined by the tire classification system.

22. The system according to claim 13, wherein classes of tires include one or more of snow tires, all-season tires, summer tires, studded tires, and tires with traction aids.

* * * * *